US008758647B2

(12) United States Patent
Schellen et al.

(10) Patent No.: US 8,758,647 B2
(45) Date of Patent: Jun. 24, 2014

(54) METHOD FOR PRODUCING SYNGAS

(75) Inventors: Ralph Schellen, Dormagen (DE); Evin Hizaler Hoffmann, Köln (DE); Leslaw Mleczko, Dormagen (DE); Stephan Schubert, League City, TX (US); Rushikesh Apte, Düsseldorf (DE)

(73) Assignee: Bayer Intellectual Property GmbH, Monheim (DE)

( * ) Notice: Subject to any disclaimer, the term of this patent is extended or adjusted under 35 U.S.C. 154(b) by 0 days.

(21) Appl. No.: 13/132,367

(22) PCT Filed: Dec. 4, 2009

(86) PCT No.: PCT/EP2009/008670
§ 371 (c)(1),
(2), (4) Date: Jun. 2, 2011

(87) PCT Pub. No.: WO2010/069485
PCT Pub. Date: Jun. 24, 2010

(65) Prior Publication Data
US 2011/0240925 A1 Oct. 6, 2011

(30) Foreign Application Priority Data

Dec. 20, 2008 (DE) .................. 10 2008 064 277

(51) Int. Cl.
*C01B 3/38* (2006.01)
*C01B 3/24* (2006.01)

(52) U.S. Cl.
USPC .......................................... 252/373; 423/650

(58) Field of Classification Search
USPC ........................................................ 252/373
See application file for complete search history.

(56) References Cited

U.S. PATENT DOCUMENTS

| 3,278,452 A * | 10/1966 | Vorum .......................... 252/376 |
| 4,620,940 A | 11/1986 | Quang et al. |
| 6,773,580 B2 * | 8/2004 | Boger et al. .................. 208/134 |
| 2007/0289215 A1 * | 12/2007 | Hemmings et al. .......... 48/127.9 |

FOREIGN PATENT DOCUMENTS

| EP | 0 155 867 A1 | 9/1985 |
| EP | 1 251 951 B1 | 10/2002 |
| WO | 03/055585 A1 | 8/2003 |

OTHER PUBLICATIONS

A.M. De Groote and G.F. Froment in "Reactor Modeling and Simulations in Synthesis Gas Production", published in Reviews in Chemical Engineering (1995) 11: 145-183.
E.L.C. Seris et al. in "Scaleable, microstructured plant for steam reforming of methane" in Chemical Engineering Journal (2008) 135S:9-16.
Johnson and Haynes "Heatric Steam Reforming Technology", 2001 Heatric (a division of Meggitt (UK) Ltd).
Kopasz J.P. et al. "Unraveling the Maze: Understanding of Diesel Reforming Through the use of Simplified Fuel Blends", International Journal of Hydrogen Energy, Elsevier Science Publishers B.V. Barking GB, vol. 30, No. 11, pp. 0360-3199, Sep. 1, 2005.
International Search Report Dated Mar. 16, 2010.

\* cited by examiner

*Primary Examiner* — Melvin C Mayes
*Assistant Examiner* — Kenneth Vaden
(74) *Attorney, Agent, or Firm* — Norris McLaughlin & Marcus PA

(57) ABSTRACT

Process for the endothermic, catalytic gas phase oxidation of hydrocarbons with steam and carbon dioxide to hydrogen and carbon monoxide (synthesis gas), performed in 5 to 30 series-connected reaction zones under adiabatic conditions.

18 Claims, 1 Drawing Sheet

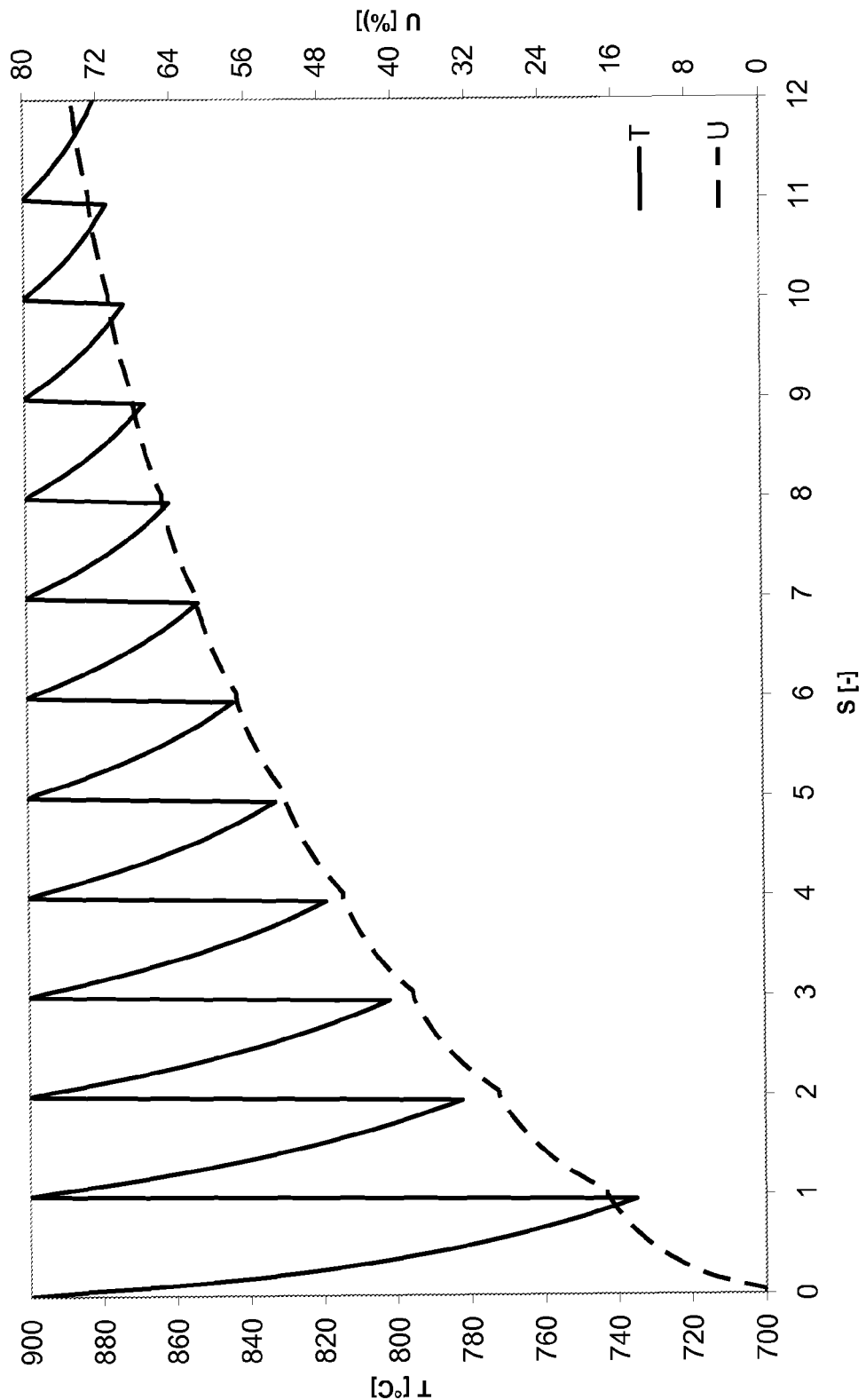

METHOD FOR PRODUCING SYNGAS

This is a 371 of PCT/EP2009/008670, filed 4 Dec. 2009 (international filing date), which claims foreign priority benefit under 35 U.S.C. §119 of German Patent Application No. 10 2008 064 277.0 filed Dec. 20, 2008

The present invention relates to a process for the endothermic, catalytic gas phase oxidation of hydrocarbons with steam and carbon dioxide to hydrogen and carbon monoxide (synthesis gas), in which the reaction is performed in 5 to 30 series-connected reaction zones under adiabatic conditions.

BACKGROUND OF THE INVENTION

Synthesis gas consists essentially of carbon monoxide and hydrogen, but may also comprise carbon dioxide.

The component reactions essential for the preparation of synthesis gas from hydrocarbons are shown in the formulae (I to III) below. The formulae relate to the conversion of methane as the hydrocarbon. For homologues of the hydrocarbon methane, correspondingly stoichiometrically corrected formulae apply, but these are likewise common knowledge.

$$CH_4 + H_2O \leftrightarrow CO + 3 \cdot H_2 \quad (I)$$

$$CO + H_2O \leftrightarrow CO_2 + H_2 \quad (II)$$

$$CH_4 + 2 \cdot H_2O \leftrightarrow CO_2 + 4 \cdot H_2 \quad (III)$$

The reactions according to the formulae (I) and (III) are strongly endothermic and represent the significant reactions in connection with synthesis gas preparation. The reaction according to formula (II) is the reaction formula known to those skilled in the art under the name "water-gas shift reaction" and is exothermic. All three reactions according to the formulae (I to III) are equilibrium-limited.

The synthesis gas obtained from such reactions constitutes an essential starting material for further conversion, for example, to tailored long-chain hydrocarbons by the Fischer-Tropsch process.

The controlled supply of heat in processes for obtaining synthesis gas is important since the position of the equilibria of the aforementioned reactions according to the formulae (I to III) is highly dependent on the temperature of the reaction zone, and hence the yields and/or selectivities for hydrogen and/or carbon monoxide can be controlled as a result.

An uncontrolled temperature decline as a result of the endothermic reactions according to the formulae (I) and/or (III) can thus promote the formation of greater or lesser amounts of carbon dioxide, which is disadvantageous for the further use of the synthesis gas, for instance, for the above-mentioned Fischer-Tropsch process. In other ranges of disadvantageous temperatures, less hydrogen may be formed, which, when this is desired as an alternative to the preparation of synthesis gas, may likewise be disadvantageous. In general, the reactions according to the formulae (I to III) must therefore be performed under very controlled temperature conditions in order to obtain advantageous yields and/or selectivities for the desired reaction products. This is especially true when the product should be synthesis gas.

It is therefore advantageous to control the temperature of the reaction zones in the course of the process at a level which enables rapid conversion with minimization of side reactions.

The aforementioned reactions according to the formulae (I to III) do not exhaustively represent the possible reactions in a reaction zone in which synthesis gas is to be formed according to this present invention. A very comprehensive overview over the multitude of reaction mechanisms possibly involved here is given, for instance, by A. M. De Groote and G. F. Froment in "Reactor Modeling and Simulations in Synthesis Gas Production", published in Reviews in Chemical Engineering (1995) 11: 145-183.

The process variants disclosed here relate exclusively to reactions which are performed in fired furnaces, in which tube bundle reactors in which the reactions are performed are present. The processes are accordingly not adiabatic processes. The embodiment as a fired furnace with tube bundles is, however, required in the process according to A. M. De Groote and G. F. Froment.

In addition, A. M. De Groote and G. F. Froment disclose that this results in significant radial and axial temperature profiles in the individual reaction zones. Especially radial temperature profiles are, however, disadvantageous because there exist, as a result, in regions of the reaction zones, sites which are not operated under optimal conditions for the reaction of the hydrocarbons to give synthesis gas. Sufficient control of the temperature in the reaction zones is thus not ensured. Moreover, the reaction apparatuses disclosed by A. M. De Groote and G. F. Froment are of very complex construction, which is likewise disadvantageous since they are at least very expensive. In the event of a fault, however, the apparatus can, in particular, only be brought back into service by shutdown and repair of the overall apparatus.

Since exact temperature control is apparently impossible, there may additionally, for instance as a result of the exothermic reaction according to the formula (II), be local excess temperatures in the reaction zones, which can damage the reaction apparatus. Together with the aforementioned disadvantage of the necessarily complex construction and the associated necessary shutdown of the entire process in the event of a fault, it follows that the process disclosed by A. M. De Groote and G. F. Froment is highly disadvantageous.

EP 1 251 951 (B1) discloses an apparatus and the possibility of performing chemical reactions in the apparatus, the apparatus being characterized by a cascade of reaction zones and heat exchanger apparatuses in contact with one another, which are arranged cohesively connected to one another in an integrated system. The process to be performed here is thus characterized by the contact of the different reaction zones with a particular heat exchanger apparatus in the form of a cascade. There is no disclosure regarding the useability of the apparatus and of the process for preparing synthesis gas.

It thus remains unclear how, proceeding from the disclosure of EP 1 251 951 (B1), such a reaction is to be performed by means of the apparatus and of the process performed therein. More particularly, no process comprising endothermic reactions is disclosed.

Moreover, for reasons of unity of invention, it has to be assumed that the process disclosed in EP 1 251 951 (B1) is performed in an apparatus identical or similar to the disclosure regarding the apparatus. The result of this is that, due to the large-area contact of the heat exchange zones with the reaction zones according to the disclosure, a significant amount of heat is transferred by conduction of heat between the reaction zones and the adjacent heat exchange zones.

The disclosure regarding the oscillating temperature profile can thus only be understood such that the temperature peaks found here would be greater if this contact were not to exist. A further indication of this is the exponential rise in the temperature profiles disclosed between the individual temperature peaks. These indicate that a certain heat sink with notable but limited capacity is present in each reaction zone, which can reduce the temperature rise therein. It can never be ruled out that a certain removal of heat (for example by radiation) takes place; however, in the case of a reduction in the possible removal of heat from the reaction zone, there would be indications of a linear temperature profile or one with declining slope, since no further metered addition of reactants is intended and thus, after exothermic complete reaction, the reaction would become ever slower and the exothermicity generated would thus decrease.

Thus, EP 1 251 951 (B1) discloses multistage processes in cascades of reaction zones, from which heat is removed in an undefined amount by conduction of heat. Accordingly, the process disclosed is not adiabatic and is disadvantageous in that exact temperature control of the reaction is impossible. This is especially true of the undisclosed possibility of an endothermic reaction in the reaction zones.

An application of the process disclosed in EP 1 251 951 (B1) to the preparation of synthesis gas using the apparatuses there is disclosed by E. L. C. Seris et al. in "Scaleable, microstructured plant for steam reforming of methane" in Chemical Engineering Journal (2008) 135S:9-16.

This discloses a process using the apparatuses according to EP 1 251 951 (B1), in which synthesis gas is prepared in nine reaction zones with heat exchange zones in between. The process variant presented is declared to be multistage and adiabatic, but it is disclosed at the same time that the reaction zones are in direct contact with the heat exchange zones, as has already been disclosed in EP 1 251 951 (B1). Although this leads to an advantageous spatial integration of the reaction zones with the heat exchange zones, this at the same time has the consequence that the term "adiabatic reaction zone" is incorrect. The reaction zones are not adiabatic since they are in direct contact with the heat exchange zones at their boundaries and thus, especially given the considerable temperature gradients between the reaction zones and the heat exchange zones, a significant heat flow takes place, which is not accounted for by the convective transport of the process gases. This is disadvantageous for the purposes of exact temperature control, which is also the subject of the process presented by E. L. C. Seris et al.

Proceeding from the prior art, it would therefore be advantageous to provide a process for preparing synthesis gas, which can be performed in simple reaction apparatuses and which enables exact simple temperature control of the endothermic process, such that it allows high conversions coupled with maximum purities of the product while maintaining desired yields and/or selectivities. Such simple reaction apparatuses would be easily convertible to an industrial scale and are inexpensive and robust in all sizes.

For the endothermic catalytic gas phase reaction of hydrocarbons with steam and carbon dioxide to give synthesis gas, as just described, no suitable processes which allow this have been identified to date.

It is therefore an object of the invention to provide a process for endothermic catalytic gas phase reaction of hydrocarbons with steam and carbon dioxide to give synthesis gas, which is performable in simple reaction apparatuses with exact temperature control and which, as a result, allows high conversions coupled with high purities of the product.

SUMMARY OF THE INVENTION

It has been found that, surprisingly, a process for preparing synthesis gas from hydrocarbons, carbon dioxide and steam in an endothermic, heterogeneously catalysed gas phase reaction, characterized in that it comprises 5 to 30 series-connected reaction zones with adiabatic conditions, achieves this object.

DETAILED DESCRIPTION

In the context of the present invention, synthesis gas refers to a process gas which comprises essentially the substances carbon monoxide and hydrogen. The synthesis gas may also comprise proportions of carbon dioxide, steam and hydrocarbons.

In the context of the present invention, hydrocarbons refer to substances present as process gas, consisting of carbon, hydrogen and optionally oxygen. Essentially, such hydrocarbons, however, consist of carbon and hydrogen.

Preferred hydrocarbons which are used as a feedstock in the process according to the invention are those selected from the list consisting of alkanes, alkenes and alkynes.

Particularly preferred hydrocarbons are alkanes. Preferred alkanes are those comprising not more than six carbon atoms, particular preference being given to methane, ethane, propane and butane, very particular preference to methane.

In the context of the present invention, steam refers to a process gas which comprises essentially water in the gaseous state.

The term "essentially" refers, in the context of the present invention, to a proportion by mass and/or a molar proportion of at least 80%.

The hydrocarbons used in the process according to the invention, the steam, the constituents of the synthesis gas and the synthesis gas as such are also referred to hereinafter collectively as process gases.

It follows from this that the entire process according to the invention is performed in the gas phase. Should the substances used in the process, for instance the hydrocarbons, not be in gaseous form at room temperature (23° C.) and ambient pressure (1013 hPa), it can be assumed hereinafter that such substances are converted to the gas phase by increasing the temperature and/or reducing the pressure before or during the use thereof in the process according to the invention.

In addition to the essential components of the process gases, they may also comprise secondary components. Non-exclusive examples of secondary components which may be present in the process gases are, for instance, argon, nitrogen and/or carbon dioxide.

According to the invention, the performance of the process under adiabatic conditions means that essentially no heat is supplied actively to, nor is heat withdrawn from, the reaction zone from outside. It is common knowledge that complete insulation to supply or removal of heat is possible only by complete evacuation with exclusion of the possibility of heat transfer by radiation. In the context of the present invention, "adiabatic" therefore means that no measures for supply or removal of heat are taken.

In an alternative embodiment of the process according to the invention, it is possible, however, to reduce heat transfer, for example by insulation by means of commonly known insulators, for example polystyrene insulating materials, or else by sufficiently great distances from heat sinks or heat sources, in which case the insulator is air.

One advantage of the inventive adiabatic mode of operation with 5 to 30 series-connected reaction zones over a non-adiabatic mode of operation is that there is no need to provide any means of heat supply in the reaction zones, which implies a considerable simplification of the construction. This gives rise especially to simplifications in the construction of the reactor and in the scaleability of the process, and an increase in the reaction conversions.

A further advantage of the process according to the invention is the possibility of very exact temperature control through the close graduation of adiabatic reaction zones. It is thus possible to set and control a temperature which is advantageous in the progression of the reaction in each reaction zone.

Yet a further advantage of the process according to the invention results because, in contrast to the above-discussed processes according to the prior art, as a result of the supply of carbon dioxide, the desired synthesis gas, i.e. an increased proportion of carbon monoxide, is obtained. In the prior art processes, predominantly hydrogen is prepared, which is likewise a constituent of the synthesis gas. However, by means of the supply of carbon dioxide, the ratio of hydrogen to carbon monoxide can be controlled in the desired manner.

The catalysts used in the process according to the invention are typically catalysts which consist of a material which, in addition to its catalytic activity for the reaction according to the formulae (I to III), is characterized by a sufficient chemical resistance under the conditions of the process, and by a high specific surface area.

Catalyst materials which are characterized by such a chemical resistance under the conditions of the process are, for example, catalysts which comprise nickel or nickel compounds.

These catalysts can be applied to support materials. Such support materials typically include aluminium oxide, calcium oxide, magnesium oxide, silicon dioxide and/or titanium dioxide. Preference is given to support materials composed of magnesium spinels.

In the context of the present invention, specific surface area refers to the area of the catalyst material which can be reached by the process gas, based on the mass of catalyst material used.

A high specific surface area is a specific surface area of at least 1 $m^2/g$, preferably of at least 10 $m^2/g$.

The inventive catalysts are each present in the reaction zones and may be present in all manifestations known per se, for example fixed bed, moving bed.

Preference is given to the fixed bed manifestation.

The fixed bed arrangement comprises a catalyst bed in the actual sense, i.e. loose, supported or unsupported catalyst in any form and in the form of suitable packings. The term "catalyst bed" as used here also includes continuous regions of suitable packings on a support material or structured catalyst supports. These would be, for example, ceramic honeycomb supports which are to be coated and have comparatively high geometric surface areas, or corrugated layers of metal wire mesh on which, for example, catalyst granules are immobilized. In the context of the present invention, a special form of packing is considered to be the presence of the catalyst in monolithic form. Such monolithic manifestations may also be foams composed of a support material, on which the aforementioned catalyst materials have been applied.

When a fixed bed arrangement of the catalyst is used, the catalyst is preferably in the form of beds of particles with mean particle sizes of 1 to 10 mm, preferably 2 to 8 mm, more preferably of 3 to 7 mm.

Likewise preferably, the catalyst is present in monolithic form in the case of a fixed bed arrangement. In the case of a fixed bed arrangement, particular preference is given to a monolithic catalyst which comprises nickel compounds supported on magnesium spinets.

When a catalyst in monolithic form is used in the reaction zones, in a preferred development of the invention, the catalyst present in monolithic form is provided with channels through which the process gases flow. Typically, the channels have a diameter of 0.1 to 3 mm, preferably a diameter of 0.2 to 2 mm, more preferably of 0.5 to 1.5 mm.

When a fluidized bed arrangement of the catalyst is used, the catalyst is preferably present in loose beds of particles, as have already been described in connection with the fixed bed arrangement.

Beds of such particles are advantageous because the particles possess a high specific surface area and, owing to their size, the mass transfer limitation of the reaction as a result of diffusion can be minimized. This allows a high conversion rate to be achieved. At the same time, the particles are thus, however, still not so small as to result in a disproportionate increase in pressure drops in the course of flow through the fixed bed. The ranges of the particle sizes specified in the preferred embodiment of the process, comprising a reaction in a fixed bed, are thus an optimum between the achievable conversion from the reactions according to the formulae (I to III) and the pressure drop obtained in the course of performance of the process. Pressure drop is directly coupled to the energy needed in the form of compressor output, such that a disproportionate increase therein would result in an uneconomic mode of operation of the process.

In a preferred embodiment of the process according to the invention, the conversion is effected in 7 to 20, and more preferably 10 to 15 series-connected reaction zones.

A preferred further embodiment of the process is characterized in that the process gas leaving at least one reaction zone is subsequently passed through at least one heat exchange zone connected downstream of this reaction zone.

In a particularly preferred further embodiment of the process, downstream of at least one reaction zone is at least one, preferably exactly one heat exchange zone through which the process gas leaving the reaction zone is passed.

The reaction zones may either be arranged in one reactor or arranged divided between several reactors. The arrangement of the reaction zones in one reactor leads to a reduction in the number of apparatuses used.

The individual reaction zones and heat exchange zones may also be arranged together in one reactor or in any combinations of in each case reaction zones with heat exchange zones divided up in several reactors.

When reaction zones and heat exchange zones are present in one reactor, in an alternative embodiment of the invention, there is a thermal insulation zone between them, in order to be able to obtain adiabatic operation of the reaction zone.

In addition, individual series-connected reaction zones may independently also be replaced or supplemented by one or more parallel-connected reaction zones. The use of parallel-connected reaction zones allows, more particularly, the exchange or addition thereof with running continuous overall operation of the process.

Parallel- and series-connected reaction zones can especially also be combined with one another. More preferably, the process according to the invention, however, has exclusively series-connected reaction zones.

The reactors used with preference in the process according to the invention may consist of simple vessels with one or more reaction zones, as described, for example, in Ullmanns Encyclopedia of Industrial Chemistry (Fifth, Completely Revised Edition, Vol. B4, page 95-104, page 210-216), in which case thermal insulation zones may additionally be provided in each case between the individual reaction zones and/or heat exchange zones.

In an alternative embodiment of the process, there is thus a thermal insulation zone at least between one reaction zone and one heat exchange zone. There is preferably a thermal insulation zone around each reaction zone.

The catalysts or the fixed beds thereof are installed in a manner known per se on or between gas-permeable walls comprising the reaction zone of the reactor. Especially in the case of thin fixed beds, technical apparatuses for homogeneous gas distribution may be installed upstream of the catalyst beds in flow direction. These may be perforated plates or other internals which bring about homogeneous entry of the process gas into the fixed bed by generating a low but homogeneous pressure drop.

In a preferred embodiment of the process, the entrance temperature of the process gas entering the first reaction zone is 700 to 1000° C., preferably from 800 to 950° C., more preferably from 850 to 900° C.

In a further preferred embodiment of the process, the absolute pressure at the inlet of the first reaction zone is between 10 and 40 bar, preferably between 20 and 35 bar, more preferably between 25 and 30 bar.

In yet a further preferred embodiment of the process, the residence time of the process gas in all reaction zones is between 0.05 and 20 s, preferably between 0.1 and 5 s, more preferably between 0.5 and 3 s.

The hydrocarbon, the carbon dioxide and the steam are preferably fed in only upstream of the first reaction zone. This has the advantage that all of the process gas is available for the absorption of heat of reaction in all reaction zones. Moreover, such a procedure can enhance the space-time yield or reduce the catalyst mass needed. However, it is also possible to meter hydrocarbon, carbon dioxide and/or steam into the process gas as and when required upstream of one or more of the reaction zones which follow downstream of the first reaction zone. The supply of these process gases between the reaction zones additionally allows the temperature and the conversion to be controlled. Among other measures and/or alternatively, the process gases can also be preheated.

In a preferred embodiment of the process according to the invention, the process gas is heated downstream of at least one of the reaction zones used, more preferably downstream of each reaction zone. To this end, the process gas, after leaving a reaction zone, is passed through one or more of the above-mentioned heat exchange zones present downstream of the particular reaction zones. These may be configured as heat exchange zones in the form of the heat exchangers known to those skilled in the art, for example tube bundle heat exchangers, plate heat exchangers, annular groove heat exchangers, spiral heat exchangers, thin-tube heat exchangers, micro heat exchangers. The heat exchangers are preferably microstructured heat exchangers.

In the context of the present invention, "microstructured" means that the heat exchanger, for the purpose of heat transfer, comprises fluid-conducting channels which are characterized in that they have a hydraulic diameter between 50 μm and 5 mm. The hydraulic diameter is calculated from four times the flow cross-sectional area of the fluid-conducting channel divided by the circumference of the channel.

In a particular embodiment of the process, the process gas is heated in the heat exchange zones by a condensation of a heat carrier medium.

Within this particular embodiment, preference is given to performing a condensation, preferably partial condensation, in the heat exchangers which contain the heat exchange zones, on the side of the heating medium.

In the context of the present invention, "partial condensation" means a condensation in which a gas/liquid mixture of a substance is used as the heating medium, and a gas/liquid mixture of this substance is also still present after heat transfer in the heat exchanger.

The performance of a condensation is particularly advantageous because, as a result, the achievable heat transfer coefficient to the process gases from the heating medium is particularly high, thus allowing efficient heating to be achieved.

The performance of a partial condensation is particularly advantageous because the release of heat by the heating medium, as a result, no longer results in a change in temperature of the heating medium, but the gas/liquid equilibrium is merely shifted. The consequence of this is that, over the entire heat exchange zone, the process gas is heated against a constant temperature. This in turn reliably prevents the occurrence of radial temperature profiles in the flow of the process gases, which improves control over the reaction temperatures in the reaction zones and especially prevents the development of local overheating as a result of radial temperature profiles.

In an alternative embodiment, instead of a condensation/partial condensation, it is also possible to provide a mixing zone upstream of the inlet of a reaction zone, in order to homogenize any radial temperature profiles which occur in the course of heating in the flow of the process gases by mixing transverse to the principal flow direction.

In a preferred embodiment of the process, the series-connected reaction zones are operated at rising or falling average temperatures from reaction zone to reaction zone. This means that, within a sequence of reaction zones, the temperature can be allowed either to rise or fall from reaction zone to reaction zone. This can be established, for example, via the control of the heat exchange zones connected between the reaction zones. Further means of adjusting the average temperature are described hereinafter.

The thickness of the reaction zones through which flow proceeds may be selected identically or differently and is calculated according to laws which are common knowledge to the person skilled in the art from the above-described residence times and the particular amounts of process gas throughput in the process. The mass flow throughputs of product gas (carbon monoxide) possible by the process in accordance with the invention, from which the amounts of process gas to be used are calculated, are typically between 5 and 10 t/h, preferably between 7 and 8 t/h, more preferably between 7.3 and 7.4 t/h.

The maximum outlet temperature of the process gases from the first reaction zone is typically within a range from 500° C. to 850° C., preferably from 650° C. to 800° C., more preferably from 700° C. to 750° C. The inlet temperatures of the downstream reaction zones can be determined freely in the process according to the invention by the person skilled in the art using the measures which follow.

The temperature in the reaction zones is controlled preferably by at least one of the following measures: selecting the dimensions of the adiabatic reaction zone, controlling the supply of heat between the reaction zones, adding further process gas between the reaction zones, molar ratio of the reactants/excess of steam and/or carbon dioxide used, addition of secondary constituents, especially nitrogen, upstream of and/or between the reaction zones.

The composition of the catalysts in the inventive reaction zones may be the same or different. In a preferred embodiment, the same catalysts are used in each reaction zone. However, it is also advantageously possible to use different catalysts in the individual reaction zones.

For instance, especially in the first reaction zone, when the concentration of the reactants is still high, a less active catalyst can be used, and, in the further reaction zones, the activity of the catalyst can be increased from reaction zone to reaction zone. The catalyst activity can also be controlled by diluting with inert materials or support material.

The process according to the invention can prepare, per 1 kg of catalyst, 0.1 kg/h to 10 kg/h, preferably 2 kg/h to 5 kg/h, more preferably 3.5 kg/h to 4.5 kg/h, of carbon monoxide as a constituent of the synthesis gas.

The process according to the invention is thus notable for high space-time yields, associated with a reduction in the apparatus sizes and a simplification of the apparatuses or reactors. This surprisingly high space-time yield is enabled by the interplay of the inventive and preferred embodiments of the novel process. Especially the interplay of graduated adiabatic reaction zones with heat exchange zones present in between and the defined residence times enables exact control of the process and the resulting high space-time yields, and a reduction in the by-products formed.

The present invention is illustrated with reference to figures, but without being restricted thereto.

BRIEF DESCRIPTION OF THE DRAWING

FIG. 1 shows reactor temperature (T) and methane conversion (U) over a number of 12 reaction zones (S) with downstream heat exchange zones (according to Example 1).

The present invention is further illustrated in detail by the example which follows, without restricting it thereto.

EXAMPLES

A process gas consisting of steam, methane and carbon dioxide is fed to the process. The molar ratio of methane to carbon dioxide is 1:1, and the molar ratio of methane to steam is 1:2. The process is conducted in a total of 12 fixed catalyst beds composed of magnesium spinel coated with nickel, a proportion of 15.2% by weight of nickel being present on the catalyst, i.e. in 12 reaction zones.

The composition of the process gas used at the inlet of the first reaction zone has the effect that the reactions according to the formulae (II and III) are forced significantly to the left-hand side of the equilibrium. This is especially true for the reaction according to formula (II).

Downstream of each reaction zone is a heat exchange zone in which the process gas leaving is heated again before it enters the next reaction zone.

The absolute inlet pressure of the process gas directly upstream of the first reaction zone is 29 bar. The length of the fixed catalyst beds, i.e. of the reaction zones, is always 0.1 m. The activity of the catalyst used does not vary over the reaction zones. The proportion of catalyst volume per unit total volume of each and every reaction zone is always 25% by volume. There is no metered addition of process gas upstream of the individual reaction zones. The residence time in the system is a total of 0.6 second.

The results are shown in FIG. 1. In this FIGURE, the individual reaction zones are shown on the x-axis, such that a spatial profile of the developments in the process becomes visible. On the left-hand y-axis, the temperature of the process gas is stated. The temperature profile over the individual reaction zones is shown as a thick, continuous line. On the right-hand y-axis, the total conversion of methane is stated. The profile of the conversion over the individual reaction zones is shown as a thick broken line.

It is evident that the inlet temperature of the process gas upstream of the first reaction zone is about 900° C. As a result of the essentially endothermic reaction to give synthesis gas under adiabatic conditions, the temperature in the first reaction zone falls to about 735° C., before the process gas is heated again in the downstream heat exchange zone. The inlet temperature upstream of the next reaction zone is again about 900° C. As a result of endothermic adiabatic reaction, it falls again to about 780° C. The sequence of cooling by endothermic adiabatic reaction and heating continues further with gradually increasing inlet temperatures upstream of the particular reaction zones. The inlet temperature of the process gas upstream of the last reaction zone thus changes, in the course of the process, to a value of about 850° C.

A conversion of methane of 74.8% is obtained. The space-time yield achieved, based on the mass of catalyst used, is 3.99 $kg_{carbon\ monoxide}/kg_{cat}h$.

The invention claimed is:

1. Process for preparing synthesis gas by reaction of a process gas consisting of hydrocarbons, carbon dioxide and steam in an endothermic, heterogeneously catalyzed gas phase reaction, comprising carrying out said reaction in 5 to 30 series-connected reaction zones under adiabatic conditions, said process gas being fed in only upstream of the first of said reaction zones and the process gas leaving each reaction zone is passed through a heat exchanger to heat it before entering the next reaction zone.

2. Process according to claim 1, wherein said reaction is carried out in 7 to 20 series-connected reaction zones.

3. Process according to claim 1, wherein the entrance temperature of the process gas entering the first reaction zone is 700 to 1000° C.

4. The process of claim 3, wherein said entrance temperature is 800 to 950° C.

5. The process of claim 4, wherein said entrance temperature is 850 to 900° C.

6. Process according to claim 1, wherein the absolute pressure at the inlet of the first reaction zone is between 10 and 40 bar.

7. The process of claim 6, wherein said absolute pressure is 20 to 35 bar.

8. Process according to claim 1, wherein the total residence time of the process gas for all of the reaction zones is between 0.05 and 20 s.

9. The process of claim 8, wherein said residence time is between 0.1 and 5 s.

10. Process according to claim 1, wherein the catalysts are present in fixed bed arrangement.

11. Process according to claim 10, wherein the catalysts are present as monoliths.

12. Process according to claim 11, wherein the monolith comprises channels with a diameter of 0.1 to 3 mm.

13. The process of claim 12 wherein said diameter of said channels is 0.2 to 2 mm.

14. Process according to claim 1, wherein the catalysts are present in beds of particles with mean particle sizes of 1 to 10 mm.

15. The process of claim 14, wherein said mean particle sizes are 2 to 8 mm.

16. Process according to claim 1, wherein between a reaction zone and a heat exchange zone there is at least one thermal insulation zone.

17. Process according to claim 16, comprising a thermal insulation zone around each reaction zone.

18. The process of claim 1, carried out in 10 to 15 series-connected reaction zones.

\* \* \* \* \*